Patented Jan. 19, 1926.

UNITED STATES PATENT OFFICE.

SAMUEL PEACOCK AND NELSON E. COOK, OF WHEELING, WEST VIRGINIA.

PROCESS FOR DEGASSING AND DEOXIDIZING STEEL.

No Drawing.     Application filed March 3, 1925.   Serial No. 12,993.

*To all whom it may concern:*

Be it known that we, SAMUEL PEACOCK and NELSON E. COOK, citizens of the United States, residing at Wheeling, in the county of Ohio and State of West Virginia, have invented certain new and useful Improvements in Processes for Degassing and Deoxidizing Steel; and we do hereby declare the following to be a full, clear, and exact description of the invention, such as will enable others skilled in the art to which it appertains to make and use the same.

This invention relates to a process for degassing and deoxidizing steel when in a molten state, and has for its object to improve the procedures heretofore proposed.

With this and other objects in view, the invention consists in the novel steps and combinations of steps constituting the process all as will be more fully hereinafter disclosed and particularly pointed out in the claim.

In order that the precise invention may be the more clearly understood, it is said:

It is well known that in the Bessemer and open hearth processes of manufacturing steel from pig iron and steel scrap mixed with ore, the iron carbide, $Fe_3C$, present in the pig iron, or rather metal, is usually assumed to be decarburized by a reaction with the iron oxide, $Fe_2O_3$, in the ore used. This reaction is usually assumed to be approximately as follows:—

(a)     $3Fe_3C + Fe_2O_3 = 11Fe + 3CO$.

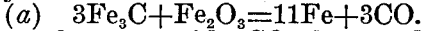

The carbon monoxide, CO, thus produced, at the instant of its formation, is usually believed to be present in the nascent state, or in a form of great chemical activity. From present studies of the subject it is also believed that under the conditions stated above, and in view of the fact that this carbon monoxide is produced in a mass of molten iron and under a high ferro-static pressure, that an iron carbonyl is formed which is further believed to be the pentacarbonyl, $Fe(CO)_5$. While it is known that this iron pentacarbonyl at atmospheric pressure dissociates at a comparatively low temperature, it is also known that this said carbonyl is readily soluble in molten iron, and there is further reason to believe that this compound remains intact so long as it remains dissolved in the molten iron. As the melting point of the carbonyl is very low, the evolution of carbon monoxide from the molten steel, while the latter is changing from the liquid to the solid state, can be explained as a result of segregation in said steel. That is, the still fluid solution of iron carbonyl concentrates in the liquid portion of the ingot as the latter solidifies, and as the quantity of molten steel necessary for its solution diminishes, more or less of the carbonyl is forced out of the solution, and instantly dissociates producing CO gas and giving rise to the phenomenon known as wild or gassed steel.

The pig iron employed in making steel by the Bessemer and open hearth processes also contains more or less hydrogen and nitrogen due to the blast furnace process employed in producing said pig iron. There is good reason to believe that this hydrogen and nitrogen gas is present in the form of a compound with iron of a nature somewhat similar to the carbonyl above mentioned. That is, the fact that these gases are liberated from the molten steel as it cools, or in other words, that they are held in the steel at very high temperatures and escape only on cooling, is accepted as evidence that compounds not now understood, are formed and dissolved in the molten steel; that upon cooling the same, they are concentrated in the more fluid portions of the ingot or casting, until there no longer remains a sufficient amount of iron in the molten state to hold such compounds in solution; and that therefore upon decomposition, the hydrogen and nitrogen of said compounds escape as gases.

Whatever may be the real explanation of the foregoing phenomena, it is well recognized that all of these gases are highly objectionable industrially when present in the steel, because in the process of cooling and concentration of said steel the more fluid, or lower melting metal eutectoids find their way toward the center of the casting, and there results a greater or less imprisonment of said gases, giving rise to a constant formation of blow holes or other gas filled cavities which are highly objectionable in the forging of the metal into shapes or in the manufacture of sound castings.

The foregoing objections are diminished or largely done away with, in carrying out the present invention wherein there is employed an alkali salt, preferably an anhydrous salt of sodium, which does not upon decomposition produce carbon dioxide or other gases. These salts or compounds are brought into contact with these said eutectoids containing dissolved carbon monoxide, nitrogen and hydrogen, such as said iron carbonyls, whereupon they are all converted into forms which are liquid at furnace temperatures, and which have relatively low melting points. These properties enable said carbonyls and other eutectoids to readily decompose and the reaction products of said decomposition to segregate out into the fluid portions of a cooling ingot or casting.

Specifically, it is preferred to use for the purpose of this invention, anhydrous trisodium aluminate, which may be introduced into the ladle or into the ingot molds in small portions, of from two to four lbs. weight enclosed in a can or other metal container.

It has been found that by following the foregoing procedure the steel is not only efficiently degassed but eutectoids heretofore encountered and containing dissolved iron oxide or other objectionable compounds, are readily reduced, and said objectionable compounds thus destroyed.

While it is not known with exactness the reactions that actually take place to effect this desired result, there is good reason to believe that the following equation represents the beginning and ending of the reaction involving an iron carbonyl.

(b)  $3Fe(CO)_5 + 5Na_6Al_2O_6 = 3Fe + 15Na_2CO_3 + 10Al$.

It is obvious that the sodium carbonate thus produced not being soluble in molten iron escapes from the molten mass by sublimation and thus the carbon monoxide of the iron carbonyl is removed from the metal and therefore cannot remain to form blow holes. From thermo-chemical principles, it can be shown that this reaction at approximately 1500° C. absorbs per pound of carbon involved only 816 B. t. u.

Should there be present in the iron an excess of iron oxide, FeO, said oxide is readily reduced to metallic iron by the aluminum of the last-mentioned equation as will be seen from the following:—

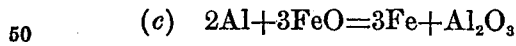

(c)  $2Al + 3FeO = 3Fe + Al_2O_3$

This reaction being exothermic produces 7828 B. t. u. per pound of aluminum oxidized. In view of the fact that in the above-mentioned carbonyl decomposition reaction illustrated in equation (b) 1.5 lbs. of aluminum are produced for every pound of carbon present in the carbonyl, it is evident that the thermal summation of these reactions taken together is very highly exothermic, and therefore these reactions are of great industrial importance.

In other words, one and one half pounds of aluminum being present for each pound of carbon, as shown by said equation (b), said one and one half pounds of aluminum will produce 10742 B. t. u. and if from this we take 816 B. t. u., we have as a net gain of heat 9926 B. t. u. for each pound of carbon present in the iron carbonyl.

The decomposition of the iron nitrides present by means of metallic aluminum and the formation of aluminum nitride which is a solid of a high melting point and which does not dissolve in the iron as does the iron nitride, supplies a means for the conversion of the nitrogen to a solid form and to a state in which it is readily segregated out of the metal during the process of cooling the ingot or casting.

As to the elimination of the hydrogen it is found to be largely dissolved in the molten metal in the form of an iron hydride. It is believed, however, that the iron and manganese sulphides in contact with aluminum react to form aluminum sulphide which at the temperature of the molten metal readily sublimes and tends to escape. But this sulphide, in contact with the said dissolved hydride of iron present, reacts to form hydrogen sulphide which being a gas under the condition stated and having a very high dissociation temperature, readily escapes.

For the sodium aluminate employed above, it is found that sodium silicate may be substituted with good results.

It will now be clear from the foregoing that by the simple expedient of adding to the molten bath the compounds such as anhydrous sodium salts, trisodium aluminate, other sodium aluminates, as well as sodium silicate, mentioned above and which readily melt in the molten iron and which form with the eutectoids present, compounds of a low melting point, that one is enabled to cause these gases to escape that heretofore have been dissolved in the iron. These gases are mainly the carbon monoxide, the hydrogen and the nitrogen that have heretofore given so much trouble and they are thus readily done away with. In other words, the above mentioned degassing compounds, form with the iron carbonyl, and other eutectoids, compounds that are non-metallic in their properties and which compounds therefore readily rise and either enter the slag or escape as gases, so that they leave the iron altogether at any of the ordinary ranges of the temperature encountered in steel making practice. The result is the production of an ingot or casting which is unusually solid and free from blow holes and at a minimum of expense. The said cast forms are likewise found to be largely free from the usual non-ferrous segregations common to practically all steel castings.

It will be clear that the deoxidation or reduction of the iron oxide present in the molten mass takes place simultaneously with the degassing of said mass and that it follows as a natural consequence of the liberation of the aluminum in the mass by the above-mentioned reaction (b).

What is claimed is:—

The process of degassing and simultaneously deoxidizing molten iron and steel metal which consists in adding to said metal anhydrous tri-sodium aluminate thereby forming compounds with any eutectoids present that melt in said metal and liberating any compounds of oxygen and carbon that are associated with said eutectoids.

In testimony whereof we affix our signatures.

SAMUEL PEACOCK.
NELSON E. COOK.